United States Patent
Hayashi et al.

(10) Patent No.: US 7,862,180 B2
(45) Date of Patent: Jan. 4, 2011

(54) OPTICAL SYSTEM FOR IMAGE PROJECTION AND IMAGE PROJECTION APPARATUS

(75) Inventors: Kohtaro Hayashi, Toyonaka (JP); Shigeru Sawamura, Osakasayama (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 816 days.

(21) Appl. No.: 11/791,180

(22) PCT Filed: Nov. 11, 2005

(86) PCT No.: PCT/JP2005/021185
§ 371 (c)(1),
(2), (4) Date: May 17, 2007

(87) PCT Pub. No.: WO2006/054671
PCT Pub. Date: May 26, 2006

(65) Prior Publication Data
US 2008/0007697 A1     Jan. 10, 2008

(30) Foreign Application Priority Data
Nov. 17, 2004  (JP) .............................. 2004-333435

(51) Int. Cl.
*G03B 21/28* (2006.01)
(52) U.S. Cl. ............................ 353/50; 353/77; 353/98; 359/449
(58) Field of Classification Search .................. 353/50, 353/77, 98, 101; 359/449, 292; 349/5
See application file for complete search history.

(56) References Cited

U.S. PATENT DOCUMENTS 5,237,399 A * 8/1993 Inada et al. .................. 348/761

6,612,704 B2    9/2003 Ogawa ........................ 353/99
(Continued)

FOREIGN PATENT DOCUMENTS

JP        04-172436 A    6/1992
(Continued)

OTHER PUBLICATIONS

Form PCT/IB/311, WO 2006/054671 A1, concerning International Application No. PCT/JP2005/021185, cites the following documents in the order they appear in the International Search Report (ISR) (with an English-language translation thereof).

(Continued)

*Primary Examiner*—Kevin Pyo
(74) *Attorney, Agent, or Firm*—Sidley Austin LLP (57) ABSTRACT

The invention provides an optical system for image projection, wherein when used in an image projection apparatus, a screen-continuing portion (e.g., screen-underlying portion) of the apparatus can be reduced to a small size, or can be removed, and thereby the apparatus can be so compacted, and provides an image projection apparatus mounting such optical system. An optical system 10 for image projection including a lighting optical system 1 leading light from a light source 11 for lighting a display element 4 (or 4'), and a projecting optical system 3 for projecting projection light containing image information from the display element 4 (or 4'). The lighting optical system 1 is arranged such that a straight optical axis α from the light source 11 in the lighting optical system 1 is positioned in an area deviated from a luminous flux β of the projection light incident into the projecting optical system 3 toward an area where the projection light γ from the projecting optical system 3 passes. The image projection apparatus A (or B or C) mounting such optical system 10.

23 Claims, 6 Drawing Sheets

U.S. PATENT DOCUMENTS 6,952,241 B2 * 10/2005 Ouchi et al. ............... 348/742
2002/0122156 A1 * 9/2002 Sawamura et al. ............ 352/81

FOREIGN PATENT DOCUMENTS

| JP | 11-327048 A | 11/1999 |
| JP | 2002-107663 A | 4/2002 |
| JP | 2002-107672 A | 4/2002 |
| JP | 2002-258174 A | 9/2002 |
| JP | 2003-114479 A | 4/2003 |
| JP | 2003-177320 A | 6/2003 |

OTHER PUBLICATIONS

Form PCT/IB/338, dated Jun. 11, 2007, concerning International Application No. PCT/JP2005/021185, with the International Preliminary Report on Patentability (PCT/IB/373) cites the following documents in the order they appear in the translation of the Written Opinion of the International Searching Authority (PCT/ISA/237).

* cited by examiner

longer side of display element

Fig.3(B)

longer side of display element

OPTICAL SYSTEM FOR IMAGE PROJECTION AND IMAGE PROJECTION APPARATUS

RELATED APPLICATIONS

This application is a National Stage of International Application No. PCT/JP2005/021185, filed Nov. 11, 2005, which is based on Japanese Patent Application No. 2004-333435 filed with the Japanese Patent Office on Nov. 17, 2004, the entire content of which is incorporated herein by reference.

TECHNICAL FIELD

The present invention relates to an optical system for image projection and an image projection apparatus using the optical system.

BACKGROUND ART

Recently in wide use are image projection apparatuses including highly efficient and low cost image projection apparatuses using a reflection type display element such as a Digital Micro-mirror Device (DMD) (Texas Instrument Co., trademark) or a reflection type liquid crystal light bulb, or a transmission type display element such as a transmission type liquid crystal light bulb in television machines for household use for BS digital broadcasting use, home theater application, etc., especially rear projection type image projection apparatuses wherein an image is projected from the rear side of the screen.

Optical systems for image projection have shown marked progress in production of smaller size and higher performance, and have been virtually equalized in image quality and in other performances as compared with expensive panel type television machines.

Image projection apparatuses using the reflection type display element are disclosed, for example, in Japanese Unexamined Patent Publication No. 2003-114479 (JP2003-114479 A) and Japanese Unexamined Patent Publication No. 2003-177320 (JP2003-177320 A). The latter publication also discloses an image projection apparatus using a transmission type display element.

These image projection apparatuses have, in principle, a lighting optical system leading light from a light source for lighting the reflection type display element or the transmission type display element, and a projecting optical system for projecting light reflected from the reflection type display element and containing image information.

However, as the image projection apparatuses have been recognized as television machines and have spread in the market, improved apparatuses have been demanded in view of compacting the image projection apparatus and in view of improving the appearance thereof. For example, in the case of image projection apparatuses having the lighting optical system and the image projecting optical system arranged in a lower portion of the apparatus, such image projection apparatuses have been demanded that a so-called underjaw portion or a so-called skirt portion (hereinafter the portion may be referred to as "screen-underlying portion") following a screen lower portion is removed when the image projection apparatus is seen from the front side thereof, or the height of the screen-underlying portion, in other words, the length of the screen-underlying portion as measured from the screen (hereinafter the portion may be referred to as "length of screen-underlying portion") is as short as possible.

Generally speaking, there is now a demand for apparatuses in which a portion following the screen (hereinafter the portion may be referred to as "screen-continuing portion") corresponding to the area wherein the lighting optical system and the projecting optical system are arranged is as short as possible.

In conventional image projection apparatuses, wherein the lighting optical system and the like are arranged in a lower portion of the image projection apparatus when seen from the front side of the image projection apparatus, the whole or greater part of the lighting optical system is located at substantially the same height or position as an optical axis of projection light coming from the display element and incident into the projecting optical system, or arranged below the optical axis of the projection light so that the length of screen-underlying portion is correspondingly longer. Especially the light source provided in respect of the lighting optical system has a reflector (light reflecting member) with a large paraboloid shape for leading the light to the lighting optical system. This enlarges the length of screen-underlying portion, as coupled with such arrangement of the lighting optical system.

Aforementioned Japanese Unexamined Patent Publication No. 2003-114479 also discloses an image projection apparatus in which the projecting optical system is a so-called L-type image projecting optical system wherein the incident light is emitted as bent, the light source is arranged as raised, and the light source optical axis is greatly inclined from a horizontal plane to shorten the length of screen-underlying portion. However, the extent of raised arrangement of the light source is limited, and minimization of the screen-underlying portion is restricted in view of a light source reflector (light reflection member) which is actually large.

DISCLOSURE OF THE INVENTION

An object of the invention is to provide an optical system for image projection comprising a lighting optical system leading light from a light source for lighting a display element and a projecting optical system for projecting projection light containing image information from the display element, wherein when the optical system for image projection is used in an image projection apparatus, length of screen-continuing portion of the image projection apparatus corresponding to an area where the optical system for image projection is arranged can be reduced to a smaller size or the screen-continuing portion can be eliminated, whereby the image projection apparatus can be so compacted.

Another object of the invention is to provide an image projection apparatus which comprises a display element producing projection light containing image information by being lighted with lighting light, a lighting optical system leading light from a light source for lighting the display element and a projecting optical system for projecting projection light from the display element, wherein length of screen-continuing portion of the image projection apparatus corresponding to an area where the lighting optical system and the projecting optical system are arranged can be reduced to a smaller size or the screen-continuing portion can be eliminated, whereby the image projection apparatus can be so compacted.

To achieve the foregoing objects, the present invention provides the following optical system for image projection and image projection apparatus.

(1) Optical System for Image Projection

An optical system for image projection comprising a lighting optical system leading light from a light source for lighting a display element, and a projecting optical system for projecting projection light containing image information from the display element, wherein the lighting optical system is arranged such that an optical axis from the light source in the lighting optical system is positioned in an area deviated from a luminous flux of the projection light incident into the projecting optical system toward an area where the projection light emitted from the projecting optical system passes.

(2) Image Projection Apparatus

An image projection apparatus comprising a display element producing projection light containing image information by being lighted with lighting light, a lighting optical system leading light from a light source for lighting the display element and a projecting optical system for projecting the projection light from the display element, wherein the lighting optical system is arranged such that an optical axis from the light source in the lighting optical system is positioned in an area deviated from a luminous flux of the projection light incident into the projecting optical system toward an area where the projection light emitted from the projecting optical system passes.

As described above, in the optical system for image projection and the image projection apparatus according to the invention, the lighting optical system is arranged such that the optical axis from the light source in the lighting optical system is positioned in the area deviated from the luminous flux of the projection light incident into the projecting optical system toward the area where the projection light emitted from the projecting optical system passes. In this case, to prevent the lighting optical system from hindering the projection of image, the lighting optical system may be arranged such that the optical axis from the light source in the lighting optical system is so arranged as to be positioned in an area where the optical axis does not interfere with the projection light emitted from the projecting optical system.

The lighting optical system may include a turning mirror for turning the lighting light at the last stage. At any rate, the area wherein the optical axis from the light source passes in the lighting optical system occupies the most portion of the lighting optical system.

In the optical system for image projection according to the invention, the optical axis from the light source is positioned in the area deviated from the luminous flux of the projection light incident into the projecting optical system toward the area where the projection light emitted from the projecting optical system passes so that a major part of the lighting optical system occupying a large space is positioned in the deviated area toward the area where the projection light emitted from the projecting optical system passes.

Thereby when this optical system for image projection is used in an image projection apparatus, it is possible to remove a bulge of the lighting optical system toward an area opposed to the area wherein the projection light emitted from the projecting optical system passes; or to reduce the same to a small extent; and it is possible to eliminate a screen-continuing portion of the image projection apparatus corresponding to the area wherein the optical system is arranged; or to restrict the length of the screen-continuing portion to a small size, whereby the image projection apparatus can be so compacted.

The area where the projection light emitted from the projecting optical system passes is a comparatively large space area so that it is easy to arrange parts constituting the lighting optical system and it is possible to arrange the optical axis from the light source horizontally or substantially horizontally, in other words, to arrange the optical axis of the light source horizontally or substantially horizontally, and thereby it is possible to increase the life of light source as compared with inclining the optical axis with respect to horizontal direction.

It is known that a life of a light source usually used in an image projection apparatus becomes shorter if an optical axis of the light source is excessively inclined with respect to horizontal direction.

In the image projection apparatus using the optical system for image projection according to the invention, the screen-continuing portion corresponding to the optical system arranging area of the apparatus can be removed, or the length of the screen-continuing portion corresponding to the optical system arranging area of the apparatus can be reduced to a small size as clear from the above, and the whole of the apparatus can be compacted to such extent, the light source optical axis can be arranged horizontally or substantially horizontally, and the light source life can be made longer than when inclined with respect to horizontal.

The following can be mentioned concerning the optical system for image projection according to the invention and the image projection apparatus according to the invention.

The direction of straight optical axis from the light source in the lighting optical system can be in parallel with the direction perpendicular to the luminous flux of the projection light incident to the projecting optical system. When the direction of straight optical axis from the light source in the lighting optical system is thus determined, the optical system for image projection and therefore the image projection apparatus can be compacted in this degree.

In this case, the straight optical axis from the light source in the lighting optical system may be horizontal (including "substantially horizontal" which might be deemed horizontal in a practical view).

When the direction of the straight optical axis in the lighting optical system is horizontal as described above, longer sides of display area of the display element may be arranged horizontally, and a projected image may be a rectangular shape having longer lateral sides.

The projecting optical system may be a L-type projecting optical system wherein the projection light incident thereto is turned and emitted. When such L-type projecting optical system is used, the optical system for image projection and therefore the image projection apparatus can be so compacted.

When the L-type projecting optical system is employed, and if the direction of straight optical axis from the light source in the lighting optical system is perpendicular to a plane including an optical axis of the projection light incident into the L-type projecting optical system and an optical axis of the projection light emitted from the L-type projecting optical system, the optical system for image projection and therefore the image projection apparatus can be compacted.

The display element can be any of reflection type display element and transmission type display element. The reflection type display element can be typically, for example, a reflection type display element which can produce images by pixel angle modulation.

The reflection type display element in which images are produced by pixel angle modulation is typically a DMD type reflection type display element. The DMD type reflection type display element is such that lighting light is incident to light reflection members constituting pixels arranged in a display area of the element, and the rotation of each of the members is controlled to thereby control the direction of light reflection face of the member, around an axis for inclination (axis for rotation), whereby light containing image information is reflected from the display area and can be utilized as the projection light.

The reflection type display element which displays images by pixel angle modulation may be of the type wherein the axis for rotation for pixel angle modulation may be in parallel with a longer side of a rectangular image display area of the display element or may be of the type wherein the axis may be in parallel with a shorter side of the display element.

In either case, when a reflection type display element is employed, a totally reflecting prism unit (TIR prism unit) may be employed. That is, it is a totally reflecting prism unit which leads lighting light emitted from the lighting optical system to the display element, and leads the image information-containing projection light from the display element to the projecting optical system.

The TIR prism unit is formed by combining a first prism into which the lighting light is injected with a second prism which emits the image information-containing projection light coming from the reflection type display element such that the neighboring opposed surfaces of the first and second prisms are taken as a critical face.

The TIR prism unit is roughly categorized into a so-called normal type (N-TIR prism unit) and a so-called reverse type (R-TIR prism unit). In the normal type prism unit, the light incident into the first prism is totally reflected at the critical face and is emitted from the first prism toward the display element, and the reflected light from the display element is injected into the first prism, is transmitted through the critical face, and is emitted from the second prism. In the reverse type prism unit, the light incident into the first prism is transmitted through the critical face, and is emitted from the second prism to light the display element, the reflected light from the display element is injected into the second prism, and is totally reflected at the critical face, and is emitted from the second prism.

When the TIR prism unit is employed in the image projection optical system according to the invention, any of the N-TIR prism unit and the R-TIR prism unit can be used.

As described above, according to the invention, there is provided an optical system for image projection comprising a lighting optical system leading light from a light source for lighting a display element and a projecting optical system for projecting projection light containing image information from the display element, wherein when the optical system for image projection is used in an image projection apparatus, length of screen-continuing portion of the image projection apparatus corresponding to an area where the optical system for image projection is arranged can be reduced to a smaller size or the screen-continuing portion can be eliminated, whereby the image projection apparatus can be so compacted.

According to the invention, there is also provided an image projection apparatus which comprises a display element producing projection light containing image information by being lighted with lighting light, a lighting optical system leading light from a light source for lighting the display element and a projecting optical system for projecting projection light from the display element, wherein length of screen-continuing portion of the image projection apparatus corresponding to an area where the lighting optical system and the projecting optical system are arranged can be reduced to a smaller size or the screen-continuing portion can be eliminated, whereby the image projection apparatus can be so compacted.

BRIEF DESCRIPTION OF THE DRAWINGS

FIG. 5(A) and FIG. 5(B) show another example of the image projection apparatus according to the invention.

FIG. 7(A) and FIG. 7(B) show further another example of the image projection apparatus according to the invention.

BEST MODE OF IMPLEMENTING THE INVENTION

Embodiments of the invention will be described.

First Embodiment

Figure 1:
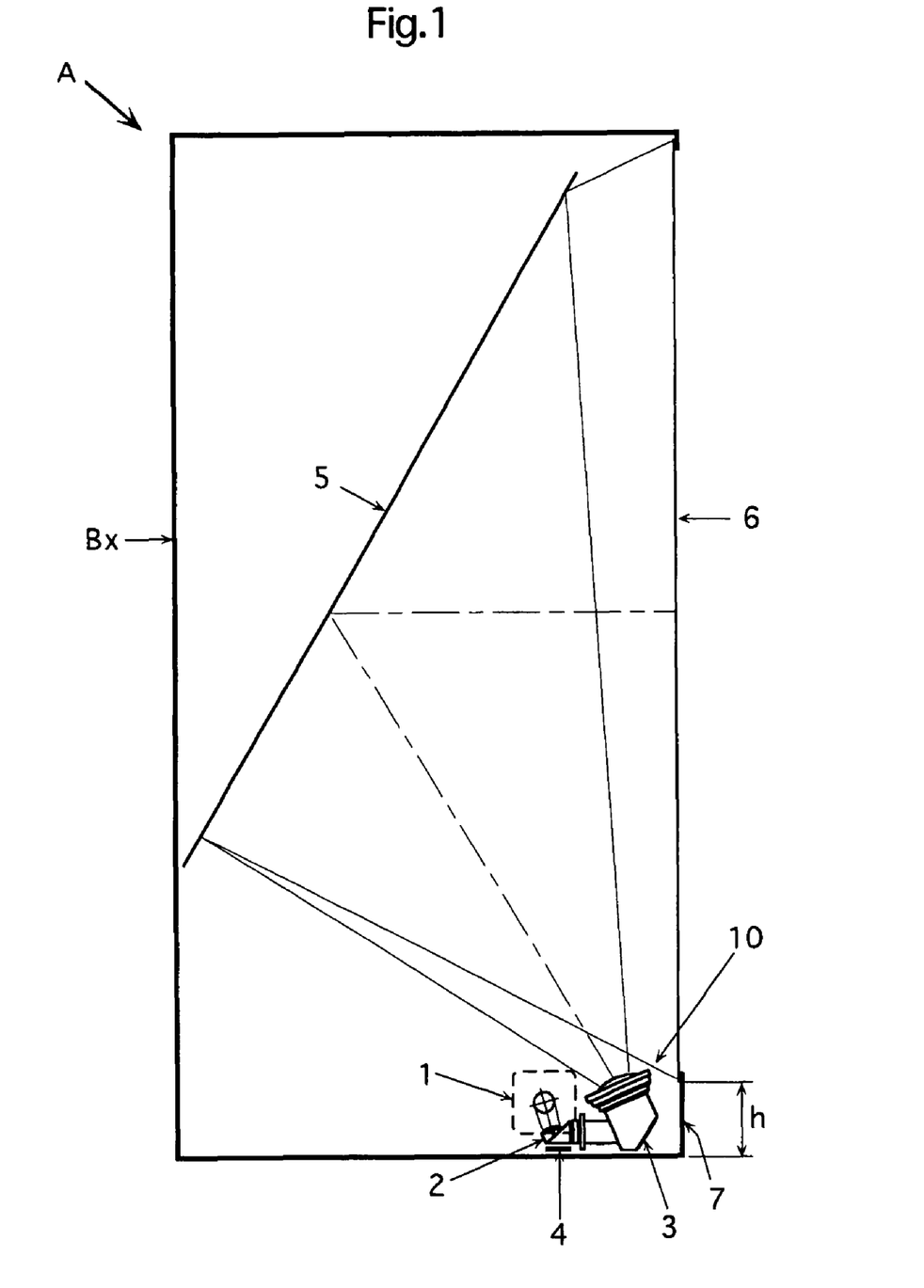
FIG. 1 is a schematic view of structure of an example of the image projection apparatus according to the invention when seen from a lateral side of the apparatus.
Figure 2:
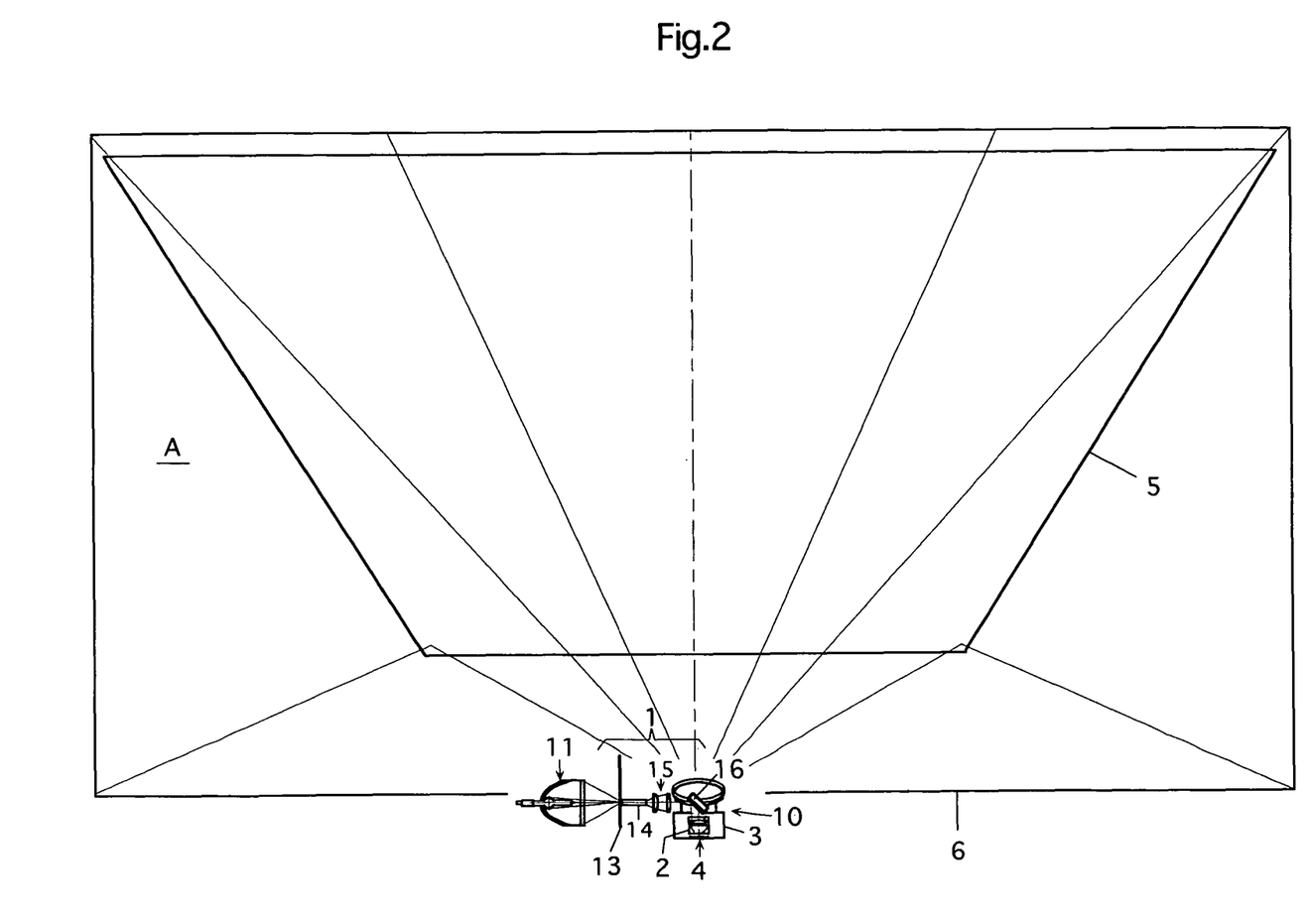
FIG. 2 shows an arrangement relation of main portions of the image projection apparatus shown in FIG. 1 when seen from a back side of the apparatus.

FIG. 1 schematically shows structure of an example A of the image projection apparatus according to the invention when seen from a lateral side of the apparatus. FIG. 2 shows an arrangement relation of main portions in the apparatus when seen from a back side of the apparatus.

Figure 3A:
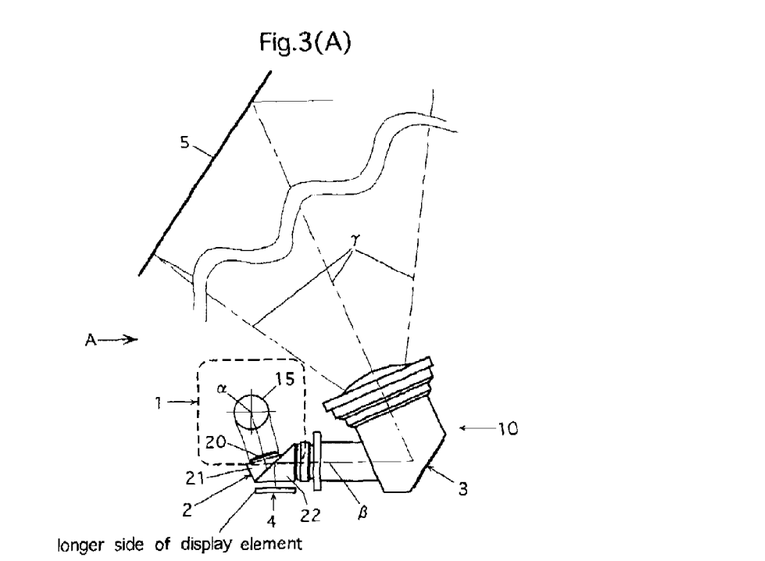
FIG. 3(A) is a side view of the main portions in the image projection apparatus shown in FIG. 1.
Figure 3B:
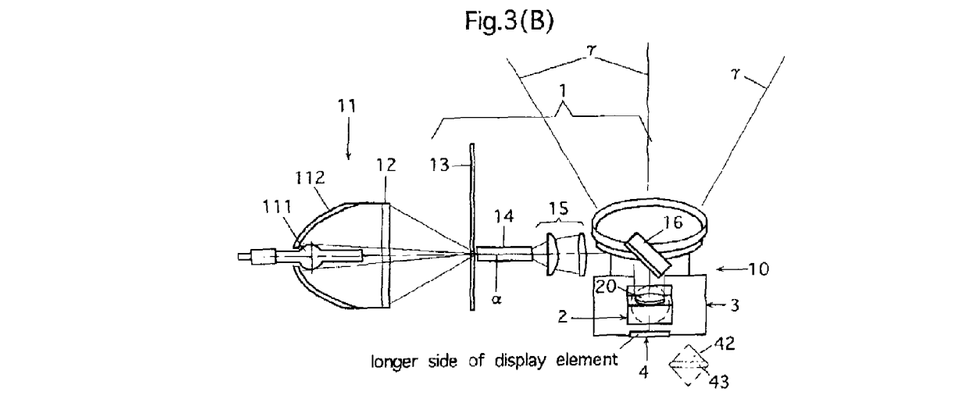
FIG. 3(B) is a view of the main portions in the apparatus when seen from a back side of the apparatus.

FIG. 3(A) is a side view showing an optical system 10 for image projection in the apparatus, a reflection type display element 4, an image reflection mirror 5 and the like, and FIG. 3(B) is a view of the same portions in the apparatus when seen from a back side of the apparatus.

FIG. 1 and FIG. 3(A) schematically show a lighting optical system 1 to be described later in the optical system 10.

The image projection apparatus A shown in FIG. 1 to FIG. 3(A) and FIG. 3(B) is provided with a light source 11 placed in a box body Bx, an optical system 10 for image projection, a reflection type display element 4 and an image reflection mirror 5, and a screen 6 set on a front side of the box body Bx.

The light source 11 includes a lamp 111 capable of emitting white light, a reflector (reflecting member) 112 and a UV-IR cut filter (ultraviolet-infrared cut filter) 12.

The optical system 10 for image projection includes a lighting optical system 1, a totally reflecting prism unit (TIR prism unit) 2 and a projecting optical system 3.

The lighting optical system 1 includes a color wheel 13, an integrator rod 14, a relay optical system 15 and a turning mirror 16.

The reflector 112 in the light source 11 has a reflecting face comprising an ellipsoid, and reflects the light from the lamp 111 and condenses the light on an incident face of the integrator rod 14 via the UV-IR cut filter 12 and the color wheel 13. The light incident into the integrator rod 14 is reflected a plurality of times within the integrator rod 14 to become uniform lighting light on an emitting face of the rod. The UV-IR cut filter 12 reflects ultraviolet and infrared rays from the lamp 111, and cut them to prevent them going toward the lighting optical system 1.

The color wheel 13 existing immediately in front of the integrator rod 14 has color filters capable of transmitting R (red), G (green) and B (blue), respectively. By rotating the wheel, the color light to be projected is changed over successively in terms of time to color an image to be projected.

The light issuing from the integrator rod 14 passes through the relay optical system 15, and is turned and reflected at the turning mirror 16, and passes through the TIR prism unit 2, and then lights the reflection type display element 4. The reflection type display element 4 will be described later.

Among the reflected light from the reflection type display element 4, ON-lights (lights reflected from pixels for image projection) pass through the TIR prism unit 2 again and are injected into the projecting optical system 3, and are projected from the optical system 3 to the image reflecting mirror 5, and are reflected and projected on the screen 6 to show an image.

The relay optical system 15, together with an entrance lens 20 attached to the TIR prism unit 2, projects an image of the emitting face of the integrator rod 14 onto a face of the reflection type display element 4 and lights the element uniformly. Namely the image of the emitting face of the integrator rod 14 is an image conjugate to the display face of the reflection type display element 4, and the shape of the emitting face of the integrator rod 14 is made substantially similar to a display area 41 of the display element 4 (see FIG. 4), so that the element 4 can be efficiently lighted.

By use of the turning mirror 16, the layout of lighting passage of lighting light is compacted.

The TIR prism unit 2 is a reverse type prism unit (R-TIR prism unit) already described which is formed by combining a first prism 21 and a second prism 22 in this example.

The lighting light injected into the first prism unit 21 is transmitted through a critical face of the second prism 22 and is emitted from the second prism 22 to light the display element 4. The projection light containing image information reflected at the display element 4 is injected into the second prism 22, is totally reflected at the critical face and is emitted toward the projecting optical system 3 from the prism 22.

The projecting optical system 3 is a so-called L-type projecting optical system at which above-mentioned incident projection light is turned and emitted. By employing the L-type projecting optical system in this way, the optical system 10 for image projection, therefore the image projection apparatus A, is so compacted.

Figure 4:
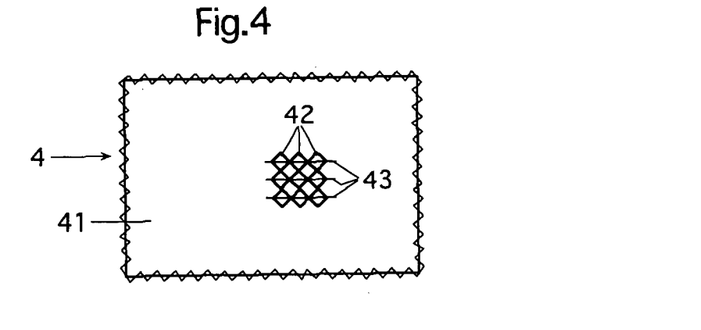
FIG. 4 is a view showing a reflection type display element employed in the image projection apparatus of FIG. 1.

The reflection type display element 4 is a DMD type display element in this example, and the display area 41 has a rectangular shape as shown in FIG. 4. Each axis 43 for inclination (axis for rotation) for angle modulation of pixel is in parallel with a longer side of the rectangular display area 41. The reflection type display element 4 is arranged in parallel with an emitting face of lighting light of the second prism 22 of the TIR prism unit 2, serving also as an incident face of the projection light. FIG. 3(B) also shows the direction of the axis 43 for inclination of the pixel when seen from upper side as shown in a chain line for reference.

The direction of the axis 43 for inclination may be in parallel with a shorter side of the display area 41. However, the image projected on the screen 6 can be made lengthwise longer when the direction of the axis 43 is rendered parallel with the longer side of the display area 41.

In the image projection apparatus A described above, as shown in figures, in the lighting optical system 1 of the optical system 10 for image projection, an area wherein a straight optical axis α passes from the light source 11 passes, more specifically, an area between the light source 11 and an area just in front of the turning mirror 16 wherein the straight optical axis α passes occupies a major portion of the lighting optical system 1.

And the straight optical axis α from the light source 11 is positioned in an area deviated from a luminous flux β of the projection light incident into the projecting optical system 3 from the TIR prism unit 2 (area above the luminous flux β in the illustrated example) toward an area where the projection light γ emitted from the projecting optical system 3 passes, but positioned in an area which does not interfere with the projection light γ (area below the projection light γ in the illustrated example).

Therefore, a major portion of the light source 11 and lighting optical system 1 occupying a great space is positioned in the area deviated toward the area where the projection light γ emitted from the projecting optical system 3 passes.

Hereby a bulge of the light source 11 and the lighting optical system 1 toward an area opposed to the passing area of the projection light γ emitted from the projecting optical system 3 (a bulge to an area below the luminous flux β in the illustrated example) is suppressed, whereby the length h of the screen-underlying portion 7 of the image projection apparatus A (height of the screen-underlying portion in the drawing) (see FIG. 1) is shortened, and the image projection apparatus A is compacted in this degree.

The area where the projection light γ from the projecting optical system 3 passes is a relatively large space area so that it is easy to arrange parts constituting the lighting optical system 1, further it is possible to arrange the straight optical axis from the light source 11 horizontally (including the case of substantially horizontal axis which can be regarded as a horizontal axis in practical use of the apparatus), in other words, it is possible to arrange an optical axis of the light source 11 horizontally.

In the image projection apparatus A, the lighting optical system 1 is such arranged that the straight optical axis α from the light source 11 is arranged horizontally and that the axis α is perpendicular to a plane including the optical axis of the projection light incident to the projecting optical system 3 and the optical axis of the projection light emitting from the projecting optical system 3. In this respect, the image projection apparatus A is compacted, and the light source life can be made longer than when the optical axis of the light source is inclined with respect to horizontal direction.

Second Embodiment

Figure 5A:
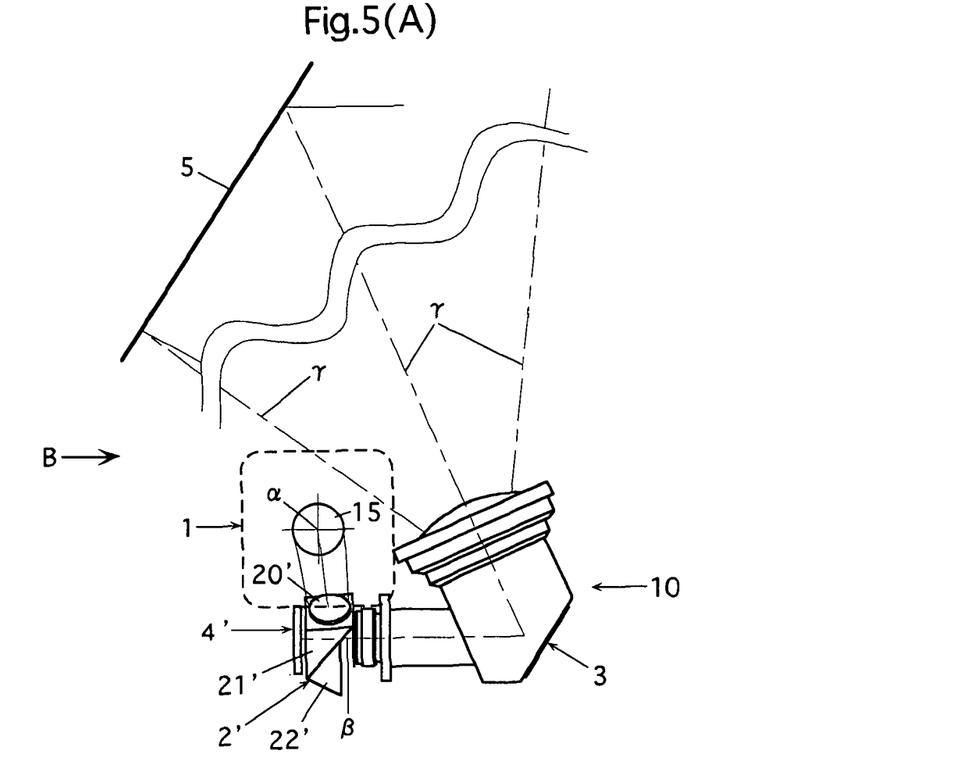
FIG. 5(A) is a side view of main portions in the apparatus and FIG. 5(B) is a view when the main portions in the apparatus are seen from a back side of the apparatus.
Figure 5B:
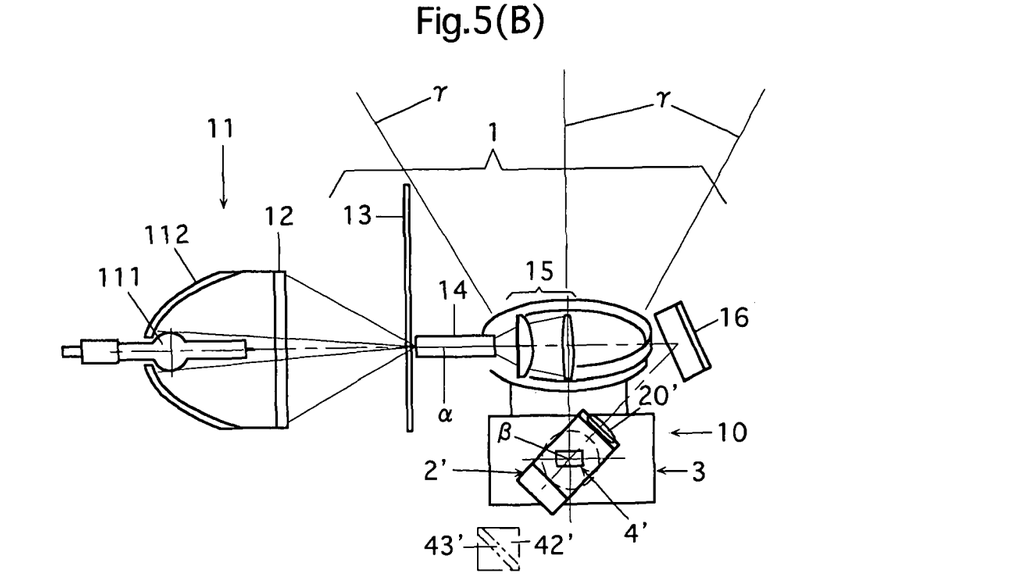

Another example B of the image projection apparatus according to the invention is shown in FIG. 5(A) and FIG. 5(B). FIG. 5(A) is a lateral side view of main portions in the image projection apparatus B. FIG. 5(B) is a view of the main portions in the apparatus B when seen from a back side of the apparatus.

In FIG. 5(A), a lighting optical system 1 of an optical system 10 for image projection is schematically shown.

The image projection apparatus B shown in FIG. 5(A) and FIG. 5(B) is different from the apparatus A shown in FIG. 1 to FIGS. 3(A) and 3(B) in the following. A TIR prism unit 2' is employed instead of the TIR prism unit 2 while a reflection type display element 4' is used instead of the display element 4, and further the arrangement posture of the turning mirror 16 in the lighting optical system 1 is slightly modified to guide the lighting light into the prism unit 2'. In other respects, the apparatus B has substantially the same structure as the apparatus A. The same parts and portions as in the apparatus A are identified with the same reference symbols in the apparatus A.

The TIR prism unit 2' is the foregoing normal type prism unit (N-TIR prism unit) which is formed by combining a first prism unit 21' and a second prism unit 22'. The first prism unit 21' is provided with an entrance lens 20'.

The lighting light incident into the first prism 21' is reflected at a critical face of the first prism 21' and is emitted from the prism 21' and lights the display element 4'. The light reflected by the display element 4' which contains image information is incident into the first prism 21', is transmitted through the critical face and is emitted from the second prism 22' toward the projecting optical system 3.

Figure 6:
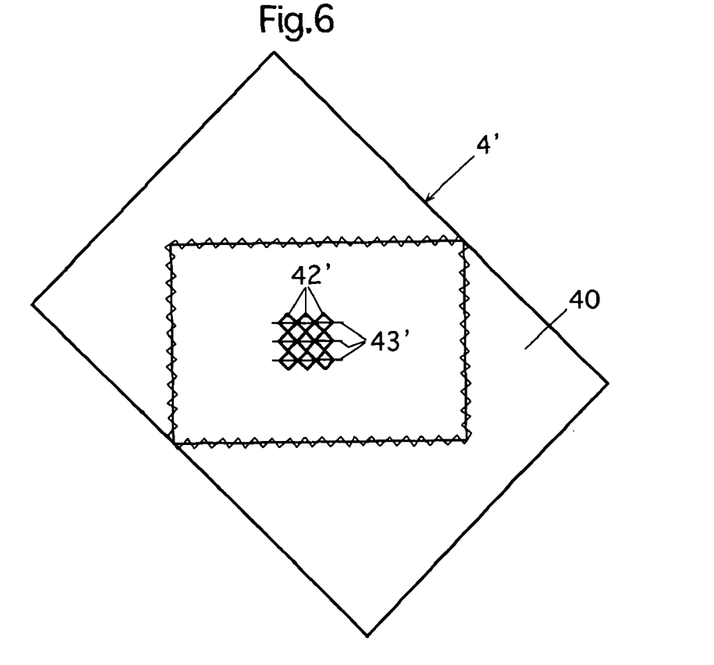
FIG. 6 is a view showing a reflection type display element employed in the image projection apparatus shown in FIG. 5(A) and FIG. 5(B).

The reflection type display element 4' is a DMD type display element, and a display area 40 as shown in FIG. 6 has a rectangular shape. An axis 43' for inclination (axis for rotation) for angle modulation of each pixel 42' is inclined at 45 degrees with respect to the longer side of the rectangular display area 40.

The element 4' is arranged in parallel with the lighting light emitting face serving also as the projection light incident face of the first prism 21' of the TIR prism unit 2'. FIG. 5 (B) also shows the direction of axis 43' for inclination of the pixel when seen from upper side, as shown in a chain line for reference.

The image projecting apparatus B is intended to light the display element 4' via the prism unit 2' with the light source 11 and the lighting optical system 1, to inject the projection light having image information from the display element 4' via the prism unit 2' into the projecting optical system 3, to emit the light therefrom and turn the light with the image reflecting mirror 5, and to project the light on the screen to show an image.

Third Embodiment

Figure 7A:
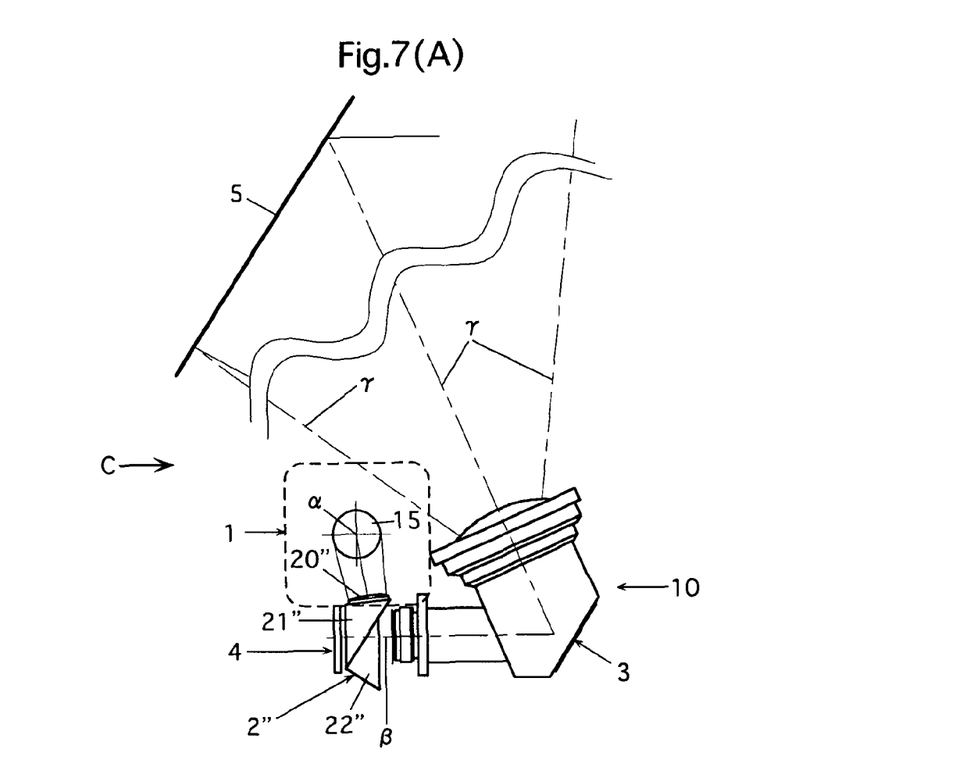
FIG. 7(A) is a side view of main portions in the apparatus and FIG. 7(B) shows the main portions in the apparatus when seen from a back side of the apparatus.
Figure 7B:
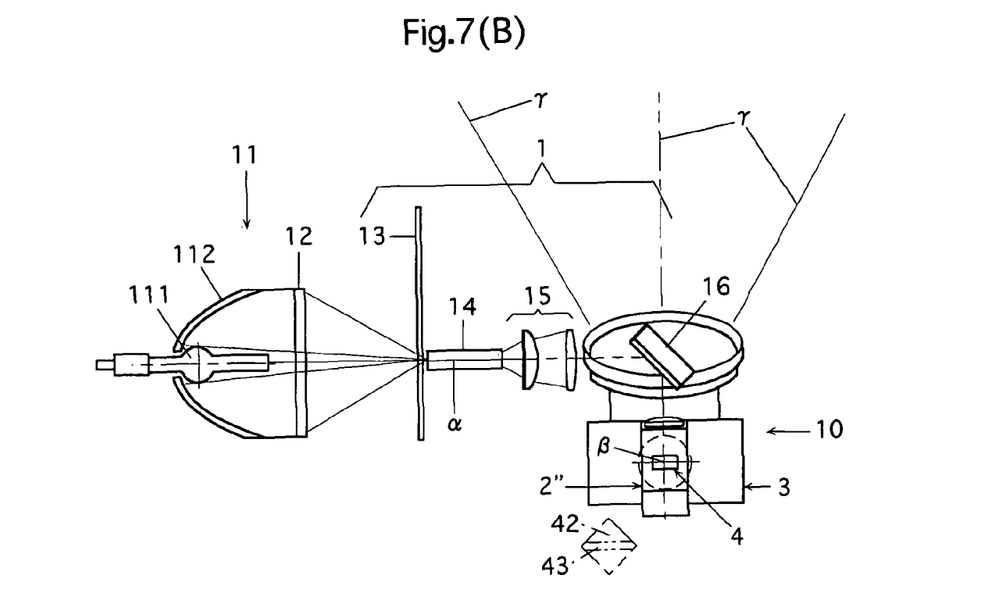

Another example C of the image projection apparatus according to the invention is shown in FIG. 7(A) and FIG. 7(B). FIG. 7(A) is a lateral side view of main portions in the image projection apparatus C, and FIG. 7(B) is a view of the main portions in the apparatus C, when seen from a back side of the apparatus.

FIG. 7(A) schematically shows a lighting optical system 1 of an optical system 10 for image projection.

The apparatus C for image projection shown in FIG. 7(A) and FIG. 7(B) is one in which a TIR prism unit 2" (comprising the first and second prisms 21" and 22") of the same type as used in the apparatus B is employed instead of the TIR prism unit 2 in the image projection apparatus A shown in FIG. 1 to FIG. 3(A) and FIG. 3(B), and wherein an arrangement posture of a turning mirror 16 in the lighting optical system 1 is slightly modified to guide the lighting light into the prism unit 2". The first prism 21" of the prism unit 2" is provided with the entrance lens 20".

The apparatus C has substantially the same structure as the apparatus A in other respects, and the same parts and portions as in the apparatus A are identified with the same reference symbols in the apparatus A.

The display element 4 is of the type shown in FIG. 4. Herein, the element 4 is arranged in parallel with a lighting light emitting face serving also as a projection light incident face of the first prism 21" of the TIR prism unit 2". In FIG. 7(B), the direction of the axis 43 for inclination of each pixel is indicated when seen from upper side in a chain line for reference.

It is possible to use the display element 4' wherein the axis 43' (axis for rotation) for angle modulation of each pixel 42' is inclined at an angle of 45 degrees with respect to the longer side of the rectangular display area 40 as shown in FIG. 6 instead of the display element 4.

This image projection apparatus C is able to light the display element 4 by the light source 11 and the lighting optical system 1 via the prism unit 2", to inject the projection light having image information via the prism unit 2" to the projecting optical system 3, and to emit the light from the projecting optical system 3 and turn the light with the image reflecting mirror 5, and to project the light on the screen to show an image.

In the image projection apparatuses B, C described above, an area where the straight optical axis a from the light source 11 passes occupies a major portion of the lighting optical system 1.

The straight optical axis a from the light source 11 is positioned in an area deviated from a luminous flux $\beta$ of the projection light incident into the projecting optical system 3 from the TIR prism unit 2' (or 2") toward an area where the projection light $\gamma$ emitted from the projecting optical system 3 passes (area above the luminous flux $\beta$ in the illustrated example), but positioned in an area which does not interfere with the projection light $\gamma$ (area below the projection light $\gamma$ in the illustrated example).

Therefore, a major portion of the light source 11 and lighting optical system 1 occupying a great space is positioned in the area deviated toward the area wherein the projection light $\gamma$ emitted from the projecting optical system 3 passes.

Hereby a bulge of the light source 11 and the lighting optical system 1 toward an area opposed to the passing area of the projection light $\gamma$ emitted from the projecting optical system 3 (a bulge to an area below the luminous flux $\beta$ in the illustrated example) is suppressed, whereby the length of the screen-underlying portion of the image projection apparatus is shortened, and the image projection apparatuses B and C are compacted in this degree.

It is easy to arrange parts constituting the lighting optical system 1, further it is possible to arrange the straight optical axis $\alpha$ from the light source 11 horizontally (including the case of substantially horizontal axis which can be regarded as a horizontal axis in practical use of the apparatus), in other words, it is possible to arrange an optical axis of the light source 11 horizontally.

In the image projection apparatuses B and C, the lighting optical system 1 is such arranged that the straight optical axis a from the light source 11 is arranged horizontally and that the axis $\alpha$ is perpendicular to a plane including the optical axis of the projection light incident to the projecting optical system 3 and the optical axis of the projection light emitting from the projecting optical system 3. In this respect, the image projection apparatuses B and C are compacted, and the light source life can be made longer than when the optical axis of the light source is inclined with respect to horizontal direction.

Figure 8:
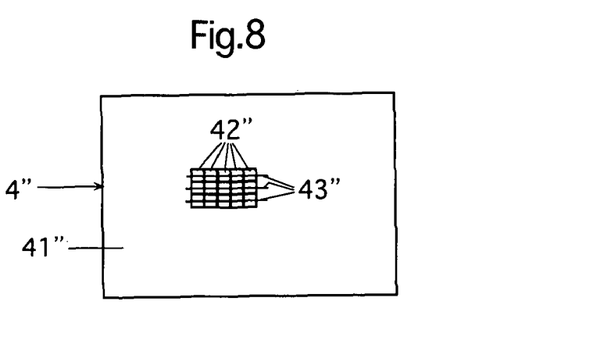
FIG. 8 is a view showing another example of the DMD type reflection type display element.

It is possible to use a different reflection type display element instead of those shown in FIGS. 4 and 6 described above, for example, an element 4" as shown in FIG. 8, in which sides of rectangular pixel 42" are in parallel with sides of rectangular display area 41", respectively, and axis 43" for inclination of the pixel is in parallel with the longer side (or may be in parallel with the shorter side) of the rectangular display area 41".

The invention can be applied also to an image projection apparatus using a transmission type display element. For example, in the image projection apparatus shown in FIG. 1 or the like, the lighting light derived from the lighting optical system is transmitted through a transmission type display element which enables image display by controlling photo transmitting capability of each pixel to obtain projection light containing image information, so that the projection light is injected into the projecting optical system, and is projected on the screen to show an image.

The invention can be applied not only to a refracting optical system but also to a reflecting optical system having a curved surface reflecting mirror; and a catadioptric system having a refracting lens and a curved surface reflecting mirror.

In the above-described embodiments, the optical axis from the light source is a straight axis, but the optical axis from the light source need not be a straight optical axis. However, if it is a straight optical axis, advantageously the arrangement of optical system parts can be simplified, and the inward thickness of image projection apparatus can be easily lessened.

In the above-described embodiments, the optical system for image projection is arranged at a lower portion of the image projection apparatus so that the projection light is projected from a lower location to an upper location, whereas if the optical system for image projection is arranged, for example, at an upper portion of the image projection apparatus, the projection light may be projected from an upper location to a lower location. In this case, the length of the portion continuing from the upper portion of the screen can be reduced to a small size.

INDUSTRIAL APPLICABILITY OF THE INVENTION

The invention can be used to provide an image projection apparatus in which a portion continuing from a screen, which portion corresponds to an optical system arranging area, is eliminated or the length of the portion is reduced to a small size, whereby the image projection apparatus is so compacted as a whole.

What is claimed is:

1. An optical system for image projection comprising:
a lighting optical system leading light from a light source for lighting a display element; and
a projecting optical system for projecting projection light containing image information from the display element, said projecting optical system being a L-type projecting optical system turning and emitting the projection light incident thereto, wherein
a straight optical axis from the light source in the lighting optical system is positioned in an area deviated from a luminous flux of the projection light incident into the projecting optical system toward an area where the projection light emitted from the projecting optical system passes, and direction of the straight optical axis is perpendicular to a plane comprising an optical axis of the projection light incident into the L-type projecting optical system and an optical axis of the projection light emitting from the L-type projecting optical system.

2. The optical system for image projection according to claim 1, wherein the direction of the straight optical axis in the lighting optical system is horizontal.

3. The optical system for image projection according to claim 1, wherein the display element is a reflection type display element in which an image is displayed by pixel angle modulation.

4. The optical system for image projection according to claim 3, further comprising a totally reflecting prism unit leading the lighting light emitted from said lighting optical system to the display element and leading the projection light containing image information from the display element to the projecting optical system.

5. The optical system for image projection according to claim 4, wherein said reflection type display element has an axis for inclination for pixel angle modulation in each pixel, and the axis for inclination for pixel angle modulation is in parallel with a longer side of a rectangular image display area of the display element.

6. The optical system for image projection according to claim 4, wherein said reflection type display element has an axis for inclination for pixel angle modulation in each pixel, and the axis for inclination for pixel angle modulation is in parallel with a shorter side of a rectangular image display area of the display element.

7. The optical system for image projection according to claim 5, wherein an axis of the lighting light incident to the display element is in parallel with the plane comprising the optical axis of the projection light incident into the L-type projecting optical system and the optical axis of the projection light emitting from the L-type projecting optical system.

8. An optical system for image projection comprising:
an integrator rod for issuing uniform lighting light;
a relay optical system for leading the lighting light emitted from an emitting face of the integrator rod to the display element; and
a projecting optical system for projecting projection light containing image information from the display element, said projecting optical system being a L-type projecting optical system turning and emitting the projection light incident thereto, wherein
a straight optical axis of the integrator rod in the lighting optical system is positioned in an area deviated from a luminous flux of the projection light incident into the projecting optical system toward an area where the projection light emitted from the projecting optical system passes, and direction of the optical axis of the integrator rod is perpendicular to a plane comprising an optical axis of the projection light incident into the L-type projecting optical system and an optical axis of the projection light emitting from the L-type projecting optical system.

9. The optical system for image projection according to claim 8, wherein the direction of the straight optical axis in the lighting optical system is horizontal.

10. The optical system for image projection according to claim 8, wherein the display element is a reflection type display element in which an image is displayed by pixel angle modulation.

11. The optical system for image projection according to claim 10, further comprising a totally reflecting prism unit leading the lighting light emitted from said lighting optical system to the display element and leading the projection light containing image information from the display element to the projecting optical system.

12. The optical system for image projection according to claim 11, wherein said reflection type display element has an axis for inclination for pixel angle modulation in each pixel, and the axis for inclination for pixel angle modulation is in parallel with a longer side of a rectangular image display area of the display element.

13. The optical system for image projection according to claim 11, wherein said reflection type display element has an axis for inclination for pixel angle modulation in each pixel, and the axis for inclination for pixel angle modulation is in parallel with a shorter side of a rectangular image display area of the display element.

14. The optical system for image projection according to claim 12, wherein an axis of the lighting light incident to the display element is in parallel with the plane comprising the optical axis of the projection light incident into the L-type projecting optical system and the optical axis of the projection light emitting from the L-type projecting optical system.

15. An image projection apparatus comprising:
a light source for emitting light;
a display element;
a lighting optical system leading the light from the light source to the display element;
a projecting optical system for projecting projection light from the display element, said projecting optical system being a L-type projecting optical system turning and emitting the projection light incident thereto, wherein
a straight optical axis in the lighting optical system is positioned in an area deviated from a luminous flux of the projection light incident into the projecting optical system toward an area where the projection light emitted from the projecting optical system passes, and direction of the straight optical axis is perpendicular to a plane comprising an optical axis of the projection light incident into the L-type projecting optical system and an optical axis of the projection light emitting from the L-type projecting optical system.

16. The image projection apparatus according to claim 15, wherein the direction of the straight optical axis in the lighting optical system is horizontal.

17. The image projection apparatus according to claim 6, wherein the projection light emitted from the projecting optical system is projected from a lower location to an upper location, and the straight optical axis is positioned above the projection light incident into the projecting optical system and below the projection light emitted from the projecting optical system.

18. The image projection apparatus according to claim 15, wherein an axis of the lighting light incident to the display element is in parallel with the plane comprising the optical axis of the projection light incident into the L-type projecting optical system and the optical axis of the projection light emitting from the L-type projecting optical system.

19. An image projection apparatus comprising:
a light source for emitting light;
a display element;
a lighting optical system leading the light from the light source to the display element;
a projecting optical system for projecting projection light from the display element, said projecting optical system being a L-type projecting optical system turning and emitting the projection light incident thereto, wherein
an optical component of the lighting optical system is positioned in a space between an area where the projection light incident into the projecting optical system from the display element passes and an area where the projection light emitted from the projecting optical system passes, and the direction of a straight optical axis of the lighting optical system is perpendicular to a plane comprising an optical axis of the projection light incident into the L-type projecting optical system and an optical axis of the projection light emitting from the L-type projecting optical system.

20. The optical system for image projection according to claim 1, wherein the straight optical axis from the light source in the lighting optical system is skewed with respect to the optical axis of the projection light incident into the L-type projecting optical system.

21. The optical system for image projection according to claim 8, wherein the straight optical axis of the integrator rod is skewed with respect to the optical axis of the projection light incident into the L-type projecting optical.

22. The image projection apparatus according to claim 15, wherein the straight optical axis from the light source in the lighting optical system is skewed with respect to the optical axis of the projection light incident into the L-type projecting optical system.

23. The image projection apparatus according to claim 19, wherein the straight optical axis from the light source in the lighting optical system is skewed with respect to the optical axis of the projection light incident into the L-type projecting optical system.

* * * * *